US012627923B2

(12) United States Patent
Ding et al.

(10) Patent No.: US 12,627,923 B2
(45) Date of Patent: May 12, 2026

(54) VEHICLE-MOUNTED SOUND SYSTEM AND OPEN-CIRCUIT DETECTION METHOD FOR LOUDSPEAKER THEREOF

(71) Applicant: SUZHOU SONAVOX ELECTRONICS CO., LTD., Suzhou (CN)

(72) Inventors: Hongbing Ding, Suzhou (CN); Yurong Wu, Suzhou (CN)

(73) Assignee: Suzhou Sonavox Electronics Co., Ltd., Suzhou (CN)

( * ) Notice: Subject to any disclaimer, the term of this patent is extended or adjusted under 35 U.S.C. 154(b) by 231 days.

(21) Appl. No.: 18/551,814

(22) PCT Filed: Dec. 20, 2021

(86) PCT No.: PCT/CN2021/139480
§ 371 (c)(1),
(2) Date: Sep. 21, 2023

(87) PCT Pub. No.: WO2022/199157
PCT Pub. Date: Sep. 29, 2022

(65) Prior Publication Data

US 2024/0179461 A1 May 30, 2024

(30) Foreign Application Priority Data

Mar. 22, 2021 (CN) ......................... 202110301372.8

(51) Int. Cl.
*H04R 3/00* (2006.01)
*H04R 29/00* (2006.01)

(52) U.S. Cl.
CPC ............. *H04R 3/00* (2013.01); *H04R 29/001* (2013.01); *H04R 2201/028* (2013.01);
(Continued)

(58) Field of Classification Search
CPC .... H04R 2420/05; H04R 3/00; H04R 29/001; H04R 2201/028; H04R 2420/03;
(Continued)

(56) References Cited

U.S. PATENT DOCUMENTS

2006/0105670 A1* 5/2006 Seymour ................ A63H 30/04 446/456
2009/0121555 A1* 5/2009 Augustyn ............. H02M 3/155 307/130
2013/0070932 A1 3/2013 Nyu et al.

FOREIGN PATENT DOCUMENTS

CN 101938685 A 1/2011
CN 109391874 A 2/2019
(Continued)

OTHER PUBLICATIONS

International Search Report and Written Opinion issued for International Patent Application No. PCT/CN2021/139480, dated Mar. 16, 2022 including English translation of ISR in 15 pages.
(Continued)

*Primary Examiner* — Lun-See Lao
(74) *Attorney, Agent, or Firm* — Knobbe, Martens, Olson & Bear, LLP

(57) ABSTRACT

Discloses are a vehicle-mounted sound system, an open-circuit detection circuit and an open-circuit detection method for a loudspeaker thereof. The vehicle-mounted sound system includes an open-circuit detection circuit including a switching circuit, the switching circuit is connected between an output port of a control module of a power amplifier and a first connecting port so as to be controlled by a control signal from an output port to conduct or cut off the output port and the first connecting port. The second connecting port is electrically connected to a node for accessing a voltage together with an input port of the control module. The control module is configured for
(Continued)

enabling the open-circuit detection circuit though the output port to determine whether the loudspeaker is in an open-circuit state according to a signal received by the input port.

12 Claims, 3 Drawing Sheets

(52) U.S. Cl.
CPC ...... *H04R 2420/03* (2013.01); *H04R 2420/05* (2013.01); *H04R 2499/13* (2013.01)

(58) Field of Classification Search
CPC ...... H04R 2499/13; H04R 3/007; H04R 3/12; H04W 4/40; B60R 2325/101; B60R 25/33; B60R 16/0215; B60R 16/0231; B60R 25/1003; H03G 3/20; H03G 3/24
USPC .......................................... 381/86, 120, 123
See application file for complete search history.

(56) References Cited

FOREIGN PATENT DOCUMENTS

| | | | | |
|---|---|---|---|---|
| CN | 110262921 A | | 9/2019 | |
| CN | 111629314 A | | 9/2020 | |
| CN | 112291697 | * | 1/2021 | ........... H04R 29/002 |
| CN | 112291697 A | | 1/2021 | |
| CN | 113242502 A | | 8/2021 | |
| CN | 214070164 U | | 8/2021 | |
| JP | 62-42396 | * | 3/1987 | ............... H04R 3/12 |

OTHER PUBLICATIONS

First Office Action received in the Chinese Patent Application No. 202110301372.8, dated Apr. 12, 2022 in 10 pages including English translation.

* cited by examiner

VEHICLE-MOUNTED SOUND SYSTEM AND OPEN-CIRCUIT DETECTION METHOD FOR LOUDSPEAKER THEREOF

CROSS-REFERENCE TO RELATED APPLICATIONS

This application is the U.S. National Phase under 35. U.S.C. § 371 of International Application PCT/CN2021/139480, filed Dec. 20, 2021, which claims priority from Chinese Patent Application No. CN202110301372.8 filed on Mar. 22, 2021. The disclosures of the above-described applications are hereby incorporated by reference in their entirety.

FIELD OF TECHNOLOGY

The present disclosure belongs to the field of audio, and in particular, relates to a vehicle-mounted sound system and an open-circuit detection method for a loudspeaker thereof.

BACKGROUND

Currently, power amplifier chips have their own function of diagnosing open-circuit or short-circuit of loudspeakers and the function of protecting when the loudspeakers is open-circuited or short-circuited, which are expensive and costly. However, in the vehicle-mounted sound systems, considering cost reasons, the vehicle-mounted power amplifier chips used in the vehicle-mounted sound systems do not have the function of diagnosing open-circuit or short-circuit of loudspeakers. When selecting this type of power amplifier chips, if it is needed to detect if a loudspeaker is mounted in the vehicle or if the loudspeaker is correctly connected, then a circuit or system for detecting open-circuit of loudspeaker must be added to the mass-produced product to complete this function, so as to determine whether it is in a loudspeaker open-circuit state, which refers to the absence of a loudspeaker or the fact that a loudspeaker is mounted but not properly connected.

SUMMARY

An aspect of the present disclosure relates to a vehicle-mounted sound system, which can achieve the open-circuit detection of the loudspeaker of the vehicle-mounted sound system at a relatively low cost.

Another aspect of the present invention relates to an open-circuit detection method for a loudspeaker of a vehicle-mounted sound system, which can achieve the open-circuit detection of the loudspeaker of the vehicle-mounted sound system at a relatively low cost.

A first aspect of the present disclosure provides a vehicle-mounted sound system comprises:

a power amplifier for driving a vehicle-mounted loudspeaker electrically connected to the power amplifier; and a control module for controlling the power amplifier, and having an output port and an input port;

the vehicle-mounted sound system further comprises:

an open-circuit detection circuit having a first connecting port and a second connecting port, one of the first connecting port and the second connecting port being electrically connected to a positive lead of the vehicle-mounted loudspeaker and the other one being electrically connected to a negative lead of the vehicle-mounted loudspeaker;

wherein, the open-circuit detection circuit comprises a switching circuit, and the switching circuit is connected between the output port of the control module and the first connecting port so as to be controlled by a control signal from the output port to conduct or cut off the output port and the first connecting port;

the input port of the control module and the second connecting port are respectively electrically connected to a node for accessing a voltage;

the control module is configured for enabling the open-circuit detection circuit though the output port to determine whether the loudspeaker is in an open-circuit state according to a signal received by the input port.

Herein, the "loudspeaker in an open-circuit state" refers to the absence of a vehicle-mounted loudspeaker or the fact that a vehicle-mounted loudspeaker is mounted but not properly connected, such as not properly connected to the power amplifier.

In an embodiment, the switching circuit comprises a triode, the base of the triode is electrically connected to the output port, the collector of the triode is electrically connected to the first connecting port, and the emitter of the triode is grounded. Optionally, the triode is an NPN type triode.

In an embodiment, the switching circuit further comprises a first resistor and a second resistor, the first resistor is electrically connected between the output port and the gate of the triode, one end of the second resistor is electrically connected to a middle point between the first resistor and the gate of the triode, and the other end of the second resistor is electrically connected to the collector of the triode.

In an embodiment, the first resistor, the second resistor and the triode together form the switching circuit.

In an embodiment, the open-circuit detection circuit further comprises a third resistor connected between the switching circuit and the first connecting port. The third resistor is used for current limiting.

In an embodiment, the node is electrically connected to a power supply terminal to access a voltage.

In an embodiment, the open-circuit detection circuit further comprises a fourth resistor for pulling up the level transmitted to an IO port, and the fourth resistor is electrically connected between the power supply terminal and the node.

In an embodiment, the open-circuit detection circuit further comprises a diode for preventing the voltage of the power amplifier from striking back to the control module, and the diode is electrically connected between the second connecting port and the input port.

In an embodiment, the open-circuit detection circuit further comprises a capacitor, and an end of the capacitor is electrically connected to a middle point between the second connecting port and the input port and the other end thereof is grounded.

In an embodiment, the power amplifier is a BTL power amplifier; and/or, the control module is a power amplifier chip, and the output port and input port are IO ports of the power amplifier chip, respectively; and/or, the loudspeaker is a loudspeaker with an impedance range of 2-8Ω.

A second aspect of the present disclosure provides an open-circuit detection circuit of a vehicle-mounted sound system having a first connecting port and a second connecting port, one of the first connecting port and the second connecting port is to be electrically connected to a positive lead of a vehicle-mounted loudspeaker and the other one is to be electrically connected to a negative lead of the vehicle-mounted loudspeaker;

the open-circuit detection circuit further comprises a switching circuit, and the switching circuit is connected between an output port of a control module of a power amplifier and the first connecting port so as to be controlled by a control signal from the output port to conduct or cut off the output port and the first connecting port;

the second connecting port is electrically connected to a node for accessing a voltage together with an input port of the control module.

In an embodiment, the switching circuit comprises a triode, the base of the triode is electrically connected to the output port, the collector of the triode is electrically connected to the first connecting port, and the emitter of the triode is grounded.

In an embodiment, the switching circuit comprises a first resistor and a second resistor, the first resistor is electrically connected between the output port and the gate of the triode, one end of the second resistor is electrically connected to a middle point between the first resistor and the gate of the triode, and the other end of the second resistor is electrically connected to the collector of the triode; the open-circuit detection circuit further comprises a third resistor connected between the switching circuit and the first connecting port; the node is electrically connected to a power supply terminal to access a voltage; the open-circuit detection circuit further comprises a fourth resistor, and the fourth resistor is electrically connected between the power supply terminal and the node.

A third aspect of the present disclosure provides an open-circuit detection method for a loudspeaker of a vehicle-mounted sound system is provided, the vehicle-mounted sound system is a vehicle-mounted sound system mentioned above, and the open-circuit detection method for a loudspeaker comprises a step of open-circuit detection, which specifically comprises:

enabling the output port of the control module to switch on the switching circuit;

determining the vehicle-mounted loudspeaker in an open-circuit state when a signal of the input port of the control module is a high-level signal;

determining the vehicle-mounted loudspeaker in a non-open-circuit state when a signal of the input port of the control module is a low-level signal.

In an embodiment, the open-circuit detection method for a loudspeaker further comprises a step of enabling the power amplifier in an off state and the output port and the input port in the low-level state when initial powered on.

In the vehicle-mounted loudspeaker and the open-circuit detection method for a loudspeaker of the present invention, an open-circuit detection circuit is further provided besides the control module, which can determine whether the loudspeaker is open-circuited by judging whether the signal output from the open-circuit detection circuit to the input port of the control module is high-level or low-level, thereby disabling or enabling the power amplifier to output normally, without the need for expensive power amplifier chips with built-in open-circuit detection function, which can achieve the open-circuit detection for a loudspeaker at a relatively low cost.

BRIEF DESCRIPTION OF THE DRAWINGS

For more clearly explaining the technical solutions of the present disclosure, the accompanying drawings required to be used to in the description of the embodiments will be simply introduced below. Apparently, the drawings in the following description show merely some embodiments of the present disclosure, and those of ordinary skill in the art may derive other drawings from these accompanying drawings without creative efforts.

DETAILED DESCRIPTION OF EXEMPLARY EMBODIMENTS

The preferred embodiments of the present disclosure are explained below in detail combining with the accompanying drawings so that the advantages and features of the present disclosure can be easily understood by the skilled persons in the art. It should be noted that the explanation on these implementations is to help understanding of the present disclosure, and is not intended to limit the present disclosure. Further, the technical features involved in the various embodiments of the present disclosure described below may be combined with each other as long as they do not conflict with each other.

As used in this description and claims, the terms "comprising" and "containing" only indicate that the clearly identified steps and elements are included, and these steps and elements do not constitute an exclusive list, and the method or device may also include other steps or elements. The term "and/or" as used herein includes any combination of one or more of the associated listed items. It can be further understood that the terms "first", "second", etc. are used to describe various information, but this information should not be limited to these terms. These terms are only used to distinguish the same type of information from each other and do not indicate a specific order or degree of importance. In fact, expressions such as "first" and "second" can be used interchangeably. For example, without departing from the scope of the present disclosure, the first information can also be referred to as the second information, and similarly, the second information can also be referred to as the first information.

Figure 1:
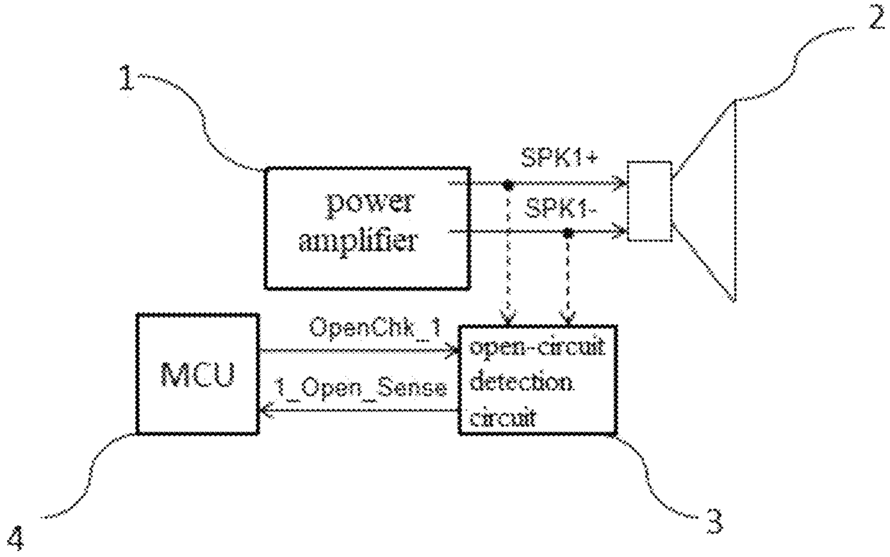
FIG. 1 is a structural block diagram of a vehicle-mounted sound system according to an embodiment of the present disclosure.
Figure 2:
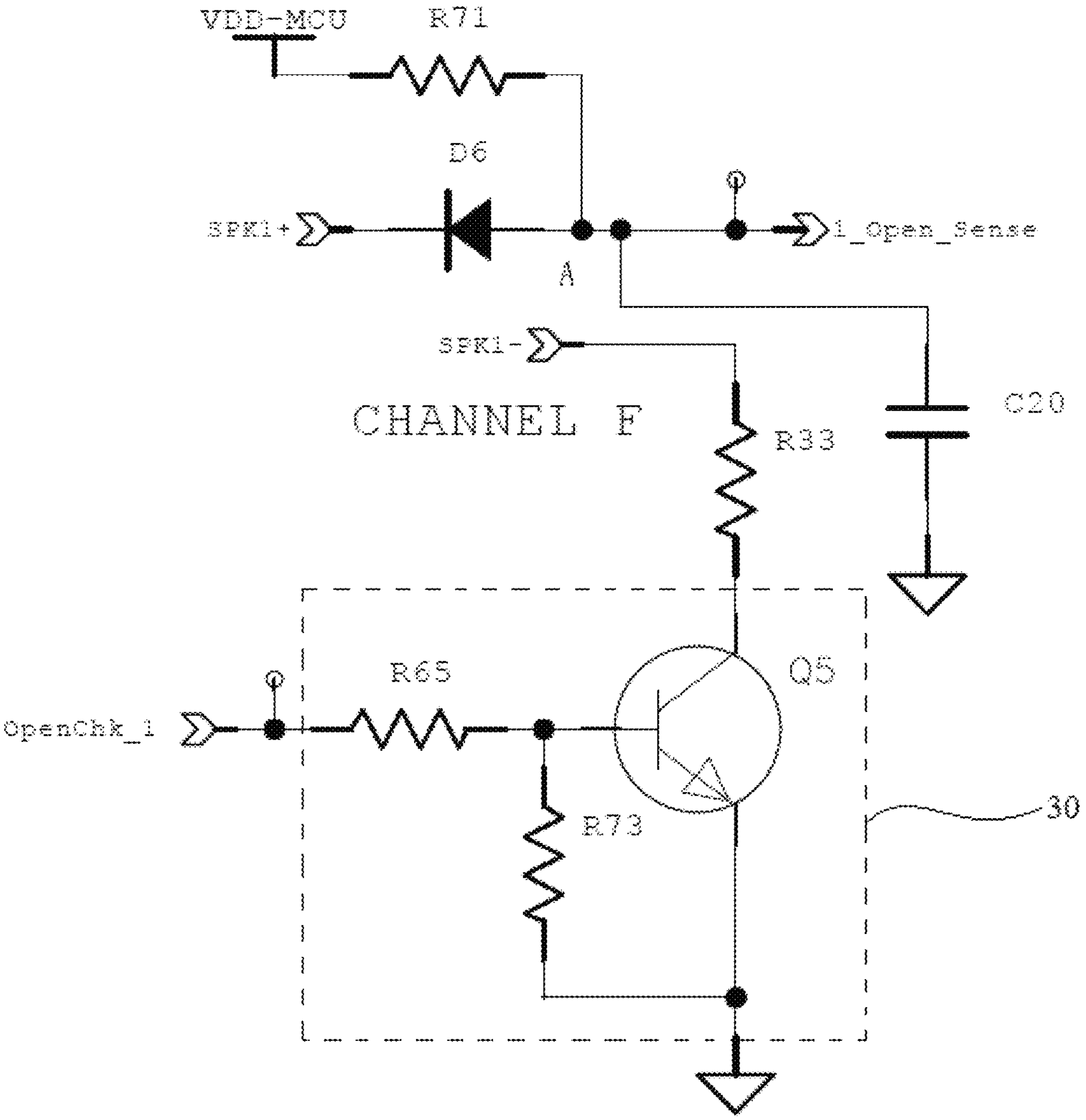
FIG. 2 is a circuit diagram of an open-circuit detection circuit according to an embodiment of the present disclosure.

As shown in FIG. 1, this embodiment provides a vehicle-mounted sound system, which comprises a power amplifier 1 used for driving a loudspeaker 2 electrically connected thereto for electroacoustic conversion; and a control module 4 used for controlling the power amplifier 1 and having an output port OpenChk_1 and an input port 1_Open_Sense. The vehicle-mounted sound system further comprises an open-circuit detection circuit 3 having a first connecting port SPK1− and a second connecting port SPK1+, the first connecting port SPK1− is electrically connected to one of the two sets of leads of the loudspeaker 2 (such as the negative lead), and the second connecting port SPK1+ is electrically connected to the other one of the two sets of leads of the loudspeaker 2 (such as the positive lead). An output port of the power amplifier is also electrically connected to the two sets of leads of the loudspeaker correspondingly to output digital or analog audio signals to the loudspeaker. For ordinary loudspeakers, each set of leads comprises a single lead, that is, the loudspeaker 2 has a pair of leads; for multi-voice-coil loudspeakers, each set of leads may comprise multiple leads, that is, the loudspeaker 2 has multiple pairs of leads. As shown in FIG. 2, the open-circuit detection circuit 3 further comprises a switching circuit 30, and the switching circuit 30 is connected between the output port OpenChk_1 of the control module 4 and the first connecting port SPK1− of the open-circuit detection circuit 3 so as to be controlled by a control signal from the output port OpenChk_1 to conduct or cut off the output port OpenChk_1 and the first connecting port SPK1−. When the entire system is in the initial state of power amplifier startup, a pulse signal emitted by the output port OpenChk_1 of the control module 4 enables the open-circuit detection circuit 3 to determine through the input port 1_Open_Sense whether there is a loudspeaker 2 connected between the second connecting port SPK1+ and the first connecting port SPK1- or whether the loudspeaker 2 has an open-circuit fault. The power amplifier 1 is a multi-channel amplifier with multiple channels, each of which can drive at least one loudspeaker.

The power amplifier 1 is a BTL power amplifier, which is a Class-D digital power amplifier with short-circuit protection function and no open-circuit detection function. The control module 4 is a power amplifier chip, specifically a micro controller unit (MCU), which comprises a micro controller unit body, the output port OpenChk_1 and the input port 1_Open_Sense, wherein the output port OpenChk_1 and the input port 1_Open_Sense are respectively the IO ports of the power amplifier chip; the loudspeaker 2 is a loudspeaker with an impedance range of 2-8Ω.

As shown in FIG. 2, the switching circuit 30 specifically comprises a triode Q5 (which is an NPN type triode), the base of the triode Q5 is electrically connected to the output port OpenChk_1, the collector of the triode Q5 is electrically connected to the first connecting port SPK1−, and the emitter of the triode Q5 is grounded (ground equipotential). The input port 1_Open_Sense and the second connecting port SPK1+ are respectively electrically connected to a node A, the node A is electrically connected to a power supply terminal VDD-MCU to access a voltage, which is consistent with the working voltage of the power amplifier chip.

The control module 4 is used for enabling the open-circuit detection circuit 3 by means of the output port OpenChk_1 to determine whether the loudspeaker is in an open-circuit state according to a signal received by the input port 1_Open_Sense.

The switching circuit 30 comprises a first resistor R65 and a second resistor R73, the first resistor R65 is electrically connected between the output port OpenChk_1 and the gate of the triode Q5, one end of the second resistor R73 is electrically connected to a middle point between the first resistor R65 and the gate of the triode Q5, and the other end of the second resistor R73 is electrically connected to the collector of the triode Q5. The first resistor R65, the second resistor R73 and the triode Q5 together form the switching circuit 30.

The open-circuit detection circuit 3 further comprises a third resistor R33 connected between the switching circuit and the first connecting port SPK1−, and the third resistor R33 is used for current limiting.

The open-circuit detection circuit 3 further comprises a fourth resistor R71 for pulling up the level transmitted to the IO port, and the fourth resistor R71 is electrically connected between the power supply terminal VDD-MCU and the node A.

The open-circuit detection circuit 3 further comprises a diode D6 used to prevent the voltage of the power amplifier from striking back to the control module 4, and the diode D6 is electrically connected between the second connecting port SPK1+ and the input port 1_Open_Sense. Specifically, the positive electrode of the diode D6 is connected to the node A, and the negative electrode is connected to the second connecting port SPK1+.

The open-circuit detection circuit 3 further comprises a capacitor C20 for filtering out high-frequency signals from the power amplifier, and an end of the capacitor C20 is electrically connected to a middle point between the second connecting port SPK1+ and the input port 1_Open_Sense and the other end thereof is grounded (ground equipotential).

Figure 3:
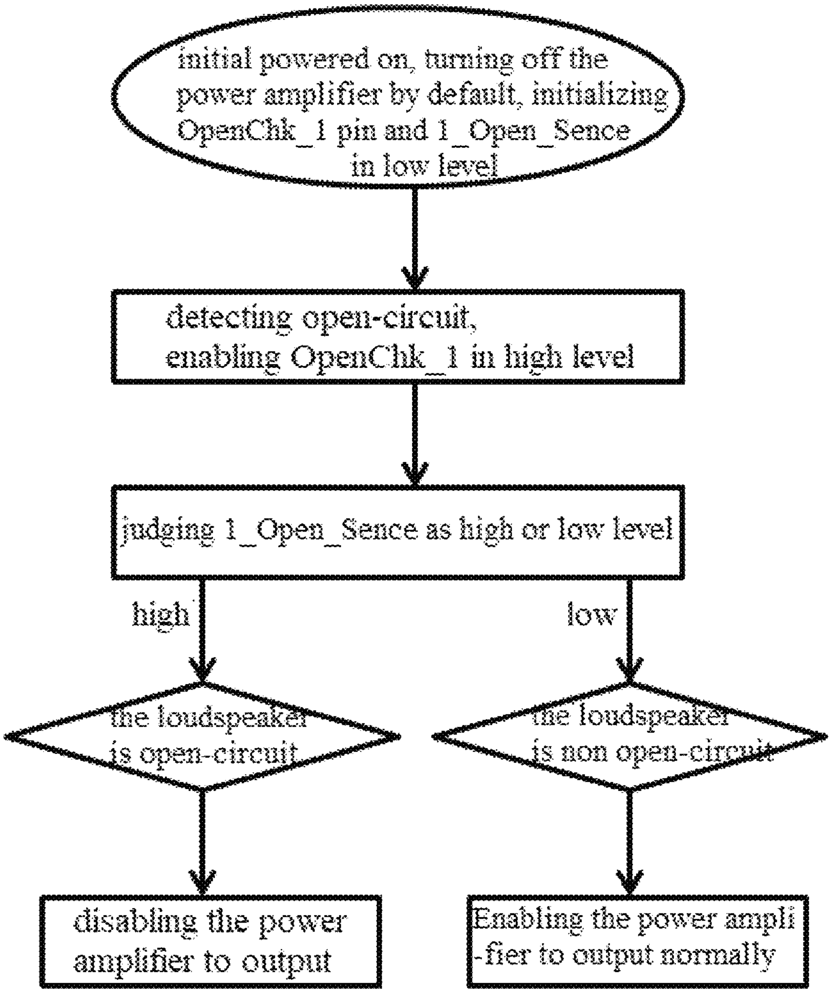
FIG. 3 is a flow chart of an open-circuit detection method for a loudspeaker according to an embodiment of the present disclosure.

This embodiment further provides an open-circuit detection method for a loudspeaker of a vehicle-mounted sound system, where the vehicle-mounted sound system is a vehicle-mounted sound system mentioned above. As shown in FIG. 3, the open-circuit detection method for a loudspeaker comprises a step of open-circuit detection, which specifically comprises:

enabling the power amplifier 1 in an off state and the output port OpenChk_1 and the input port 1_Open_Sense in low-level state when initial powered on;

enabling the output port OpenChk_1 of the control module 4 to switch on the switching circuit;

determining that the loudspeaker 2 is in an open-circuit state when a signal of the input port 1_Open_Sense of the control module 4 is a high-level signal;

determining that the loudspeaker 2 is in a non open-circuit state when a signal of the input port 1_Open_Sense of the control module 4 is a low-level signal.

In this embodiment, in the initial power-on stage of the power amplifier system, the MCU does not start the power amplifier chip first, leaving the power amplifier in the STANDBY state, so that the output of the power amplifier is in a high-impedance state. The open-circuit detection circuit is formed by two IO ports, namely OpenChk_1 and 1_Open_Sense of the MCU, the resistors R33, R65, R71 and R73, the capacitor C20, the diode D6, and the triode Q5. The two IO ports of the MCU are utilized, one configured to output and the other one configured to input. When initial powered on, the condition that the power amplifier has a high impedance output, enables the output IO port OpenChk_1 of the MCU is in high level, in this way, the triode Q5 is switched on. When there is no loudspeaker connected or the loudspeaker has an open-circuit fault, if 1_Open_Sense is in high level, the MCU determines that the loudspeaker is open-circuit; when the triode Q5 is switched on and there is a loudspeaker between SPK1+ and SPK1−, 1_Open_Sense port will be pulled down, then when the MCU receives a low-level signal of 1_Open_Sense port, it will determine that the loudspeaker is in a non open-circuit state. After determining the non open-circuit state of the loudspeaker, it enables OpenChk_1 port to have a low-level output, which switches off the triode Q5 and enables the power amplifier to output, keeping the power amplifier in normal working state. This embodiment provides a vehicle-mounted loudspeaker having a power amplifier 1, a control module 4 and an open-circuit detection circuit 3 that are independent of each other, which can determine whether the loudspeaker is open-circuit by judging whether the signal of the input port1_Open_Sense of the control module 4 is high-level or low-level, thereby disabling or enabling the power amplifier to output normally.

The open-circuit detection method for a loudspeaker provided in this embodiment can complete the open-circuit detection for a loudspeaker without using an external circuit and system, without the need for expensive power amplifier chips with built-in open-circuit detection functions, and without affecting the normal operation of the system, and can achieve the open-circuit detection for a loudspeaker at a relatively low cost.

The embodiments described above are only for illustrating the technical concepts and features of the present disclosure, are preferred embodiments, and are intended to make those skilled in the art being able to understand the present disclosure and thereby implement it, and should not be concluded to limit the protective scope of this disclosure.

We claim:

1. A vehicle-mounted sound system, comprising:

a power amplifier configured to drive a vehicle-mounted loudspeaker electrically connected thereto;

a control module configured to control the power amplifier, and having an output port and an input port; and an open-circuit detection circuit having a first connecting port and a second connecting port, one of the first connecting port and the second connecting port being electrically connected to a positive lead of the vehicle-mounted loudspeaker and the other one of the first connecting port and the second connecting port being electrically connected to a negative lead of the vehicle-mounted loudspeaker;

wherein:

the open-circuit detection circuit comprises a single switching circuit, the single switching circuit is connected between the output port of the control module and the first connecting port so as to be controlled by a control signal from the output port to conduct or cut off the output port and the first connecting port;

the input port of the control module and the second connecting port are electrically connected to a node for accessing a voltage;

the control module is configured to enable the open-circuit detection circuit through the output port to determine whether the vehicle-mounted loudspeaker is in an open-circuit state according to a signal received by the input port;

the single switching circuit comprises a single triode, a base of the single triode is electrically connected to the output port, a collector of the single triode is electrically connected to the first connecting port, and an emitter of the single triode is grounded; and the open-circuit detection circuit further comprises a diode configured to prevent a voltage of the power amplifier from striking back to the control module, and the diode is electrically connected between the second connecting port and the input port.

2. The vehicle-mounted sound system according to claim 1, wherein the single switching circuit further comprises a first resistor and a second resistor, the first resistor is electrically connected between the output port and a gate of the single triode, one end of the second resistor is electrically connected to a middle point between the first resistor and the gate of the single triode, and the other end of the second resistor is electrically connected to the collector of the single triode.

3. The vehicle-mounted sound system according to claim 1, wherein the open-circuit detection circuit further comprises a third resistor connected between the single switching circuit and the first connecting port.

4. The vehicle-mounted sound system according to claim 1, wherein the node is electrically connected to a power supply terminal to access the voltage.

5. The vehicle-mounted sound system according to claim 4, wherein the open-circuit detection circuit further comprises a fourth resistor, and the fourth resistor is electrically connected between the power supply terminal and the node.

6. The vehicle-mounted sound system according to claim 1, wherein the open-circuit detection circuit further comprises a capacitor, an end of the capacitor is electrically connected to a middle point between the second connecting port and the input port, and the other end of the capacitor is grounded.

7. The vehicle-mounted sound system according to claim 1, wherein the power amplifier is a BTL power amplifier; and/or, the control module is a power amplifier chip, and the output port and the input port are IO ports of the power amplifier chip, respectively.

8. The vehicle-mounted sound system according to claim 1, wherein the vehicle-mounted loudspeaker is a loudspeaker with an impedance range of 2-8 Ω.

9. An open-circuit detection method for a loudspeaker of the vehicle-mounted sound system according to claim 1, comprising a step of open-circuit detection, the step of open-circuit detection comprising:

enabling the output port of the control module to switch the single switching circuit on;

determining, when the signal received by the input port of the control module is a high-level signal, that the vehicle-mounted loudspeaker is in the open-circuit state; and determining, when the signal received by the input port of the control module is a low-level signal, that the vehicle-mounted loudspeaker is in a non-open-circuit state.

10. The open-circuit detection method for the loudspeaker according to claim 9, further comprising enabling the power amplifier in an off state and enabling the output port and the input port in a low-level state when initially powered on.

11. An open-circuit detection circuit of a vehicle-mounted sound system, comprising a first connecting port and a second connecting port, wherein:

one of the first connecting port and the second connecting port is electrically connected to a positive lead of a vehicle-mounted loudspeaker and the other one of the first connecting port and the second connecting port is electrically connected to a negative lead of the vehicle-mounted loudspeaker;

the open-circuit detection circuit comprises a single switching circuit, the single switching circuit is connected between an output port of a control module of a power amplifier and the first connecting port so as to be controlled by a control signal from the output port to conduct or cut off the output port and the first connecting port;

the second connecting port is electrically connected to a node for accessing a voltage together with an input port of the control module;

the single switching circuit comprises a single triode, a base of the single triode is electrically connected to the output port, a collector of the single triode is electrically connected to the first connecting port, and an emitter of the single triode is grounded; and the open-circuit detection circuit further comprises a diode configured to prevent a voltage of the power amplifier from striking back to the control module, and the diode is electrically connected between the second connecting port and the input port.

12. The open-circuit detection circuit according to claim 11, wherein:

the single switching circuit comprises a first resistor and a second resistor, the first resistor is electrically connected between the output port and a gate of the single triode, one end of the second resistor is electrically connected to a middle point between the first resistor and the gate of the single triode, and the other end of the second resistor is electrically connected to the collector of the single triode;

the open-circuit detection circuit further comprises a third resistor connected between the single switching circuit and the first connecting port;

the node is electrically connected to a power supply terminal to access the voltage; and the open-circuit detection circuit further comprises a fourth resistor, and the fourth resistor is electrically connected between the power supply terminal and the node.

* * * * *